United States Patent [19]

Corrigan et al.

[11] Patent Number: 4,860,203

[45] Date of Patent: Aug. 22, 1989

[54] APPARATUS AND METHOD FOR EXTRACTING DOCUMENTATION TEXT FROM A SOURCE CODE PROGRAM

[75] Inventors: Colleen M. Corrigan, Chicago, Ill.; Lawrence W. Hunter, Austin, Tex.; John A. Modry, Rochester, Minn.

[73] Assignee: International Business Machines Corporation, Armonk, N.Y.

[21] Appl. No.: 908,436

[22] Filed: Sep. 17, 1986

[51] Int. Cl.[4] .......................... G06F 3/00; G06F 15/00
[52] U.S. Cl. ................................... 364/300; 364/280; 364/280.4; 364/266.6
[58] Field of Search .................... 364/300, 200, 900

[56] References Cited

U.S. PATENT DOCUMENTS

| | | | |
|---|---|---|---|
| 3,839,630 | 10/1974 | Olander, Jr. et al. | 364/200 |
| 3,938,103 | 2/1976 | Welin | 364/200 |
| 3,939,453 | 2/1976 | Schroeder | 364/900 |
| 4,099,230 | 7/1978 | Mead | 364/200 |
| 4,319,321 | 3/1982 | Anastas et al. | 364/200 |
| 4,370,707 | 1/1983 | Phillips et al. | 364/200 |
| 4,398,249 | 8/1983 | Pardo et al. | 364/300 |
| 4,437,184 | 3/1984 | Cork et al. | 371/19 |
| 4,488,258 | 12/1984 | Struger et al. | 364/900 |
| 4,554,631 | 11/1985 | Reddington | 364/300 |
| 4,656,582 | 4/1987 | Chaitin et al. | 364/300 |
| 4,656,583 | 4/1987 | Auslander et al. | 364/300 |
| 4,667,290 | 5/1987 | Goss et al. | 364/300 |
| 4,734,854 | 3/1988 | Afshar | 364/300 |

OTHER PUBLICATIONS

Bauer et al, "Compiler Construction", 1974, pp. 528-531.
IBM Technical Disclosure Bulletin, vol. 24, No. 12, 5/82, "Computer Program Documentation" by R. D. Parrott, p. 6540.
IBM Technical Disclosure Bulletin, vol. 15, No. 5, 12/72, "Self-Documenting Macros" by A. Lichtman, p. 2153.
IBM Technical Disclosure Bulletin, vol. 20, No. 11B, 4/78, "Program Documentation Air Method" by P. Theisen, p. 4840.
IBM Technical Disclosure Bulletin, vol. 19, No. 10, 3/77, "Program Design Query System", by G. J. Myers, p. 3809.
IBM Technical Disclosure Bulletin, vol. 18, No. 7, 12/75, "Flograms" by J. L. Campbell, p. 2335.

Primary Examiner—Parshotam S. Lall
Assistant Examiner—Christopher L. Makay
Attorney, Agent, or Firm—Thomas E. Tyson

[57] ABSTRACT

An apparatus for producing machine executable object code, a program listing and a listing of design documentation from a source code program consisting of a plurality of statements of implementation code including keywords and a plurality of statements of design documentation code wherein the design documentation code includes words corresponding to the keywords of the implementation code. The apparatus includes a processor for reading the source code program, a compiler for producing the machine executable object code from the implementation code, and the program listing. Furthermore, the apparatus includes an extractor that produces the design documentation by listing all of the design documentation code with the corresponding keywords in the order of appearance in the source program.

10 Claims, 11 Drawing Sheets

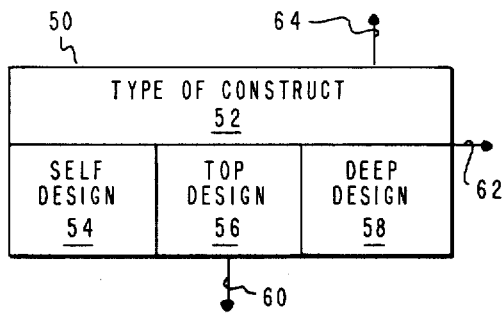
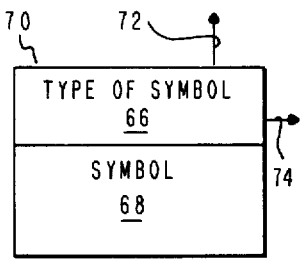
FIG. 3A    FIG. 3B
```
¦ Conduct iterative Search
  Repeat
      CALL search (NS);
      IF  ¦¦ search succeeds
          ¦NS = 0
      THEN ¦¦ set status indicator
           ¦status := yes
      ELSE ¦CALL recover (NS)¦
  UNTIL
      status = yes
```
FIG. 4

```
! Conduct iterative search
repeat !_____
       !_____
       Call search (NS) ;

!_____
       if ! search succeeds
           NS = 0
       then ! set status indicator
           status := yes
       else !_____
           call recover (NS)
until !_____
    status = yes
```

FIG. 10

```
! Conduct iterative search
REPEAT !_____
       !_____
       !_____
       IF ! search succeeds
       THEN ! set status indicator
       ELSE !_____
UNTIL !_____
```

FIG. 12

APPARATUS AND METHOD FOR EXTRACTING DOCUMENTATION TEXT FROM A SOURCE CODE PROGRAM

TECHNICAL FIELD

This invention relates to generating documentation for software program source code and more specifically to extracting design documentation statements that are imbedded in the source code.

BACKGROUND ART

The documentation for computer software is usually written after the software has been developed. This documentation is usually separate from the software. However, it is the common practice of programmers to place documentation in their computer software or source code. This internal documentation is commonly referred to as comment statements and includes text information that is not compiled when the source code is compiled into object code or machine executable code. Comment statements normally only address certain small segments of the overall computer software are usually maintained in the source code itself. Prior use of comments in source code is disclosed in U.S. Patent 4,488,258 entitled "Programmable Controller with Control Program Comments" which discloses a controller system that provides a means for producing a mnemonic and comment number when comments are entered into a terminal keyboard wherein the comments are stored separately from the program and automatically displayed to the user. Another prior reference that discloses computer generated documentation is U.S. Patent 4,370,707 entitled "Computer System for Generating Architectural Specifications and Project Control Instructions" which discloses an automated system for preparing printed architectural specifications and instructions. This system includes the means to combine data stored in different files to assemble the desired specifications and instructions.

Other attempts at computer program documentation include the IBM Technical Disclosure Bulletin entitled "Computer Program Documentation", Vol. 24, No. 12, May, 1982, that discloses a way to combine commented source code to produce documentation. IBM Technical Disclosure Bulletin, Vol. 15, No. 7, December, 1972, entitled "Self-Documenting Macros", discloses a new macro instruction operand which when expended would provide documentation containing information presented in the macro instruction operand.

It is an object of the present invention to provide an apparatus and method of generating external documentation from documentation imbedded in the source code. It is a further object of the present invention to provide an apparatus and method of verifying the source code with the documentation contained therein.

DISCLOSURE OF THE INVENTION

In accordance with the present invention, an apparatus for producing machine executable object code, a program listing, and corresponding design documentation is provided. The object code, program listing and documentation are obtained from a source code program having a plurality of statements of implementation code including keywords and several statements of design documentation code that include words corresponding to the keywords of the implementation code. The apparatus includes an input means for reading the source code and a compilation means for producing the machine executable object code from the implementation code where the machine executable object code includes executable commands derived from the implementation code keywords, and the program listing is a listing of all the code in the order of appearance in the source program. This apparatus further includes an extractor means for producing the design documentation by listing all of the keywords with the corresponding design documentation code in the order of appearance in the source program.

In the preferred embodiment, the design code also includes the designation of the code as design code.

In the further embodiment, the apparatus includes a comparison capability for verifying that the implementation code includes corresponding design documentation code. Further, an error indication capability is provided that designates locations in the source program where the implementation code does not correspond to the design documentation code. In this embodiment, omission errors are indicated in the program listing and the design documentation code listing by the insertion of design comment templates at the locations where the omission errors occur.

BRIEF DESCRIPTION OF THE DRAWING

The novel features believed characteristic of the invention are set forth in the appended claims. The invention itself, however, as well as other features and advantages thereof, will be best understood by reference to the following Best Mode for Carrying Out the Invention, when read in conjunction with the accompanying figures, wherein:

FIG. 3A is a schematic diagram symbol of a program branch node.

FIG. 3B is a schematic diagram symbol of a program leaf node.

FIG. 4 is an example listing of Pascal code.

FIG. 10 is a program listing of the Pascal code of FIG. 4 including the corrected design documentation code statements.

FIG. 12 is a listing of the extracted design documentation code.

BEST MODE FOR CARRYING OUT THE INVENTION

This invention provides documentation for a software program. The contents of this documentation are statements imbedded in the software program code when the software is originally written. The invention includes extending the high level language used to write the program code to include a series of low level design specification statements that define and document algorithms that are being performed in the program code. These design specification statements, termed design comments, describe the purpose of its corresponding implementation code. In the preferred embodiment, the correspondence between the design comment and the implementation code is provided by locating the design comment adjacent to the implementation code it describes. In describing the purpose of the implementation code statements, the design comments include the high level language code words, or keywords, to describe the code operation. These keywords or code words are the same words that are used in the implementation code.

The implementation code written in the high level language must be transformed into machine executable code, commonly known as object code. The transformation of the high level language source code into object code is accomplished by the use of a compiler which is a program executed in a computer that receives the source program as an input and produces the object program consisting of machine executable statements which implement the functions of the source program. A reference for compilers is Principles of Compiler Design by Alfred V. Ahao and Jeffrey D. Ullman published by Addison-Wesley Publishing Company, 1977.

Figure 1:
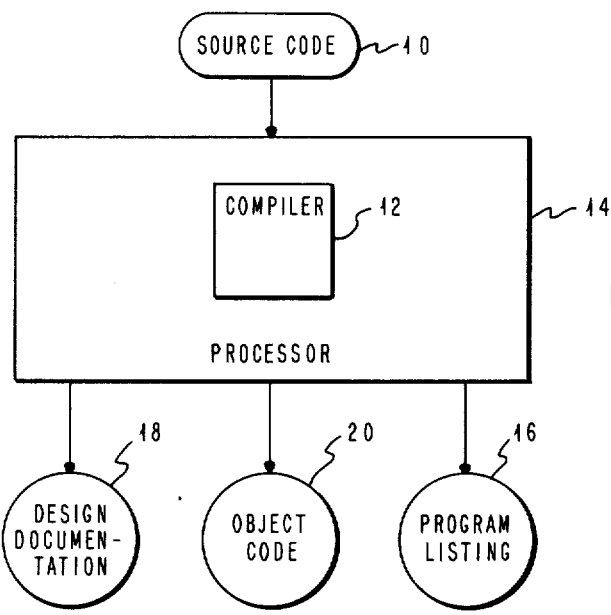
FIG. 1 is a block diagram of the invention illustrating the source code input to a processor containing a compiler which provides the design documentation output.

The present invention is implemented as a compiler. FIG. 1 is a block diagram that illustrates a compiler 12 contained within a processor 14 that receives input source code 10 and produces the object code 20, a program listing 16 and the design documentation 18. In the prior art, it is common for a compiler to produce the object code or machine executable statements and a program listing. The present invention improves on existing compiler design by also providing the design documentation as a separate output. In addition, the present invention provides a means for verifying the design documentation against the statements in the program source code to provide indications where design documentation may be omitted or indications of where design documentation may be incorrect, i.e. inconsistent as compared to the implementation code.

Figure 2:
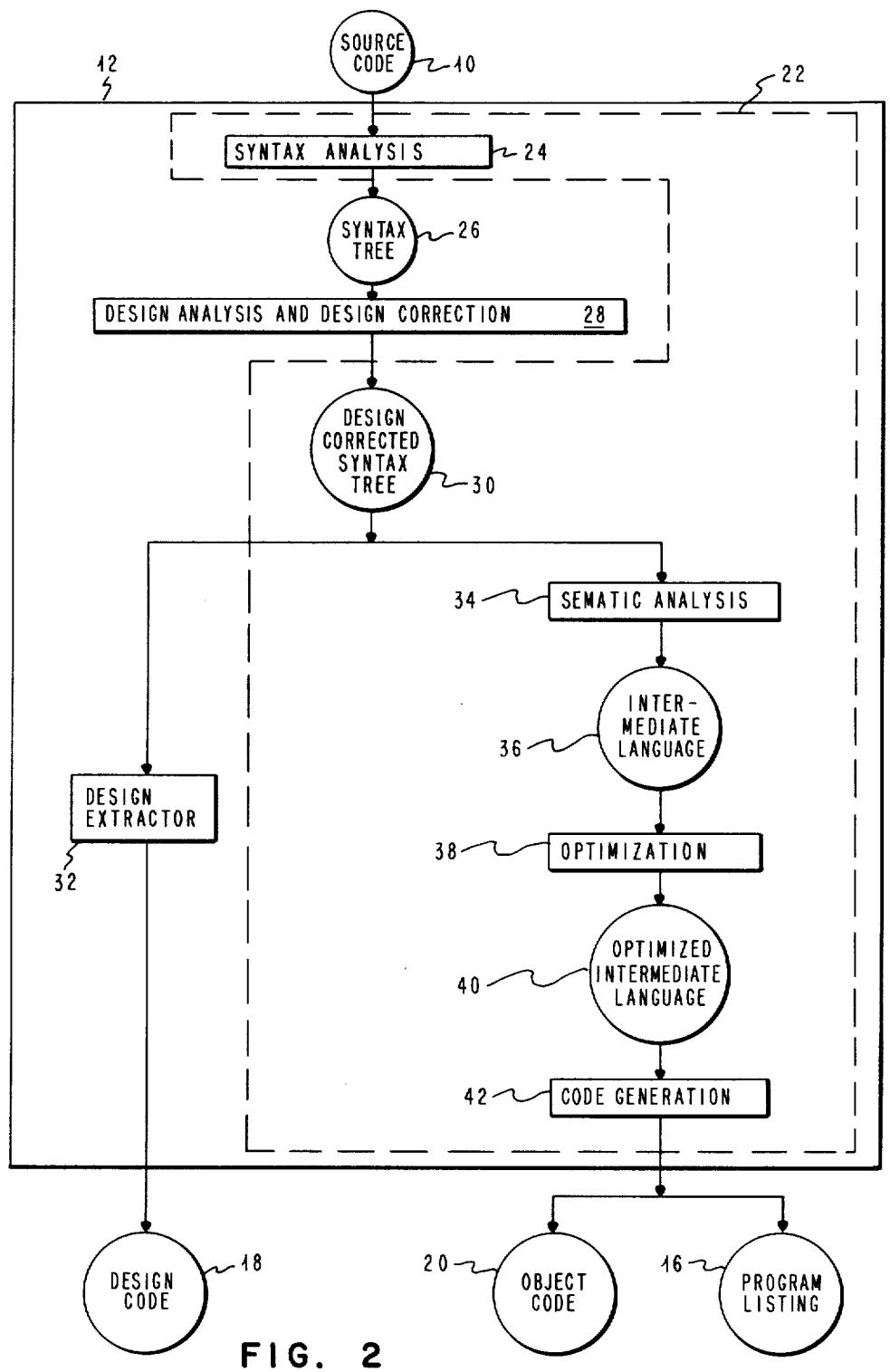
FIG. 2 is a program flow chart illustrating the production of the design code, object code and program listing from the source code.

FIG. 2 illustrates a block diagram of the compiler 12 of the present invention. Block 22 illustrates the section of this inventive compiler 12 that exists conventionally among compilers with one exception. The exception being the syntax analysis procedure 24 and syntax tree procedure 26 which will be later described in more detail. The source code 10 is input into the syntax analysis block 24. The syntax analysis block builds a syntax tree 26. The syntax analysis portion of a compiler is commonly termed a parser. The function and operation of a parser in analyzing syntax and in building the syntax tree is explained in Chapters 4 and 5 of the reference Principles of Compiler Design previously referred to and herein incorporated by reference. The compiler 12 then analyzes the syntax tree 26 within the design analysis and design correction procedure 28 to produce the design corrected syntax tree 30. The output of the design corrected syntax tree 30 is input to the design extractor procedure 32 and the semantic analysis procedures 34. The output of the design extractor procedure 32 is the design documentation code 18. The semantic analysis procedure 34 outputs an intermediate language 36 which is then input into an optimization procedure 38. The output of this optimization procedure 38 is the optimized intermediate language 40 which is input to a code generation section 42. The code generation procedure 42 then outputs the object code 20 and the source program code listing 16. In the present invention, the production of the program listing 16 and the object code 20 is in accordance with the teachings of prior art and will not be discussed. However, the syntax analysis of the design documentation code in the syntax analysis procedure 24, the production of the syntax tree 26 including the design documentation code imbedded in this syntax, the design analysis and design correction procedure 28 that verifies the correctness of the design documentation to the corresponding program source code, the production of the design corrected syntax tree 30 including the design documentation code, and the design extractor procedure 32 are unique to the present invention.

The syntax analysis procedure 24 examines the input source code and separates characters of the source code into groups that logically belong together, called tokens. The usual tokens are keywords, such as DO or IF as in FORTRAN, identifiers, such as variable names X or NUM, operator symbols such as = or +, and punctuation symbols such as ( or ,. These tokens are provided in a stream of tokens which are next analyzed. This analysis consists of two functions, analyzing whether or not the tokens occur in patterns that are permitted by the specification of the source language, and the second, to produce a tree-like structure of the tokens to be used by the subsequent procedures of the compiler. In explaining the construction of the syntax tree, certain symbols will be used. It should be understood that this symbology for the construction of the syntax tree is unique to this invention but the method of construction of the syntax tree is old in the art and is explained in detail in the previously discussed reference.

The syntax tree includes both branch nodes and leaf nodes. The symbol for the branch node is illustrated in FIG. 3A. In FIG. 3A, the branch node block 50 is illustrated. Block 50 consists of section 52 that defines the type of construct and three status design fields 54, 56 and 58. Portion 54 defines whether or not that construct design specification is consistent, C, inconsistent, I, or none, N. In a similar manner, the portion 56 specifies whether the design specification for this construct's immediate constituents are consistent. Still further, portion 58 defines whether or not the design specifications within this construct's constituents below the top level are consistent. Additionally, block 50 includes an arrow 60 that is linked to the eldest descendant (if any) of the branch node. Arrow 62 links the branch node 50 to the next eldest sibling (if any). Arrow 64 links the branch node 50 to its parent.

The self design status field is labeled consistent or C if the eldest descendant is a design comment. Otherwise, the self design status field is listed as none or N.

The top design status field is listed as consistent, C, if there is at least one subtree, and all constituent subtrees have their respective self design fields equal consistent or C. The top design status field is listed inconsistent or I if there are at least two subtrees, at least one with the self design status field as consistent or C and at least one with the self design status field listed as none or N. The top design status field is listed as none or N if there are no subtrees or if all subtrees have their self design status fields equal N or none.

The deep design status field is listed as consistent if there are no subtrees that have their top design status fields listed as inconsistent or if there are no subtrees that have their deep design status fields listed as inconsistent. The deep design status field is listed as inconsistent or I if any of the subtrees have their top design status fields listed as inconsistent or their deep design status fields listed as inconsistent.

The schematic block for the leaf node 70 is illustrated in FIG. 3B. It includes portion 66 which defines the type of symbol and a second portion 68 containing the symbol. Arrow 72 links the leaf node 70 to its parent and arrow 74 links the leaf node 70 to the next eldest sibling (if any).

The leaf node 70 and branch node 50 will be used in constructing the syntax tree in this discussion of the preferred embodiment. FIG. 4 includes a sample of program source code in Pascal. It should be understood by those skilled in the art that any high level language program may be used. The actual design documentation statements is specified in the language by an "!" at the beginning of the design comment. The location of the design comment is adjacent to the high level language implementation code as illustrated in FIG. 4. In FIG. 4, the Pascal code 76 is a set of code statements to conduct an iterative search using a subroutine called search. Line 77 includes an exclamation point in the beginning and is thus denoted as a design comment. Additionally, line 82 includes a Pascal keyword (IF) and the design comment as designated.

Figure 5:
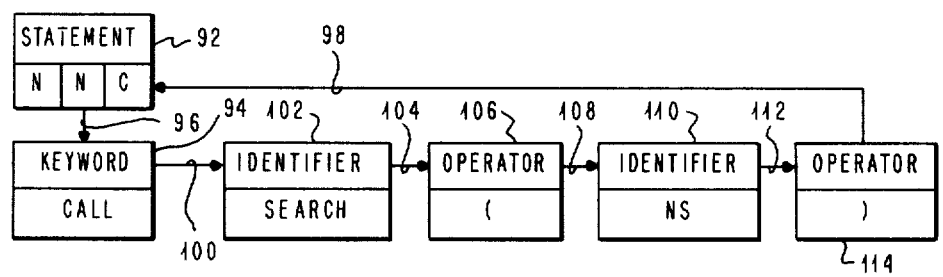
FIG. 5 is a schematic representation of the call statement in FIG. 4.

To illustrate the formation of a portion of the syntax tree, line 80 is analyzed using the branch node and leaf node symbology in FIG. 5. In FIG. 5, branch node 92 specifies the construct as a statement. Further, branch node 92 indicates that the design status of the self design status field is an N representing none. The design status of the top design status field is also a N representing none. The design status of the deep design status field is C or consistent. Branch node 92 is connected to the leaf node 94 by arrow 96. The leaf node 96 indicates that the symbology is a keyword and the actual symbol is call. The next eldest sibling 102 is connected by line 100 and is identified as the identifier "search". The next eldest sibling is connected by line 104 and is the operator "(". The next eldest sibling is connected by line 108 and is the identifier "NS". The next eldest sibling connected by line 112 is the operator ")" as illustrated in block 114. The line 98 connects this last eldest sibling 114 to its parent, the branch node 92. The example of FIG. 4 is analyzed using the syntax tree with the consistency information of the design status fields as shown.

Figure 6:
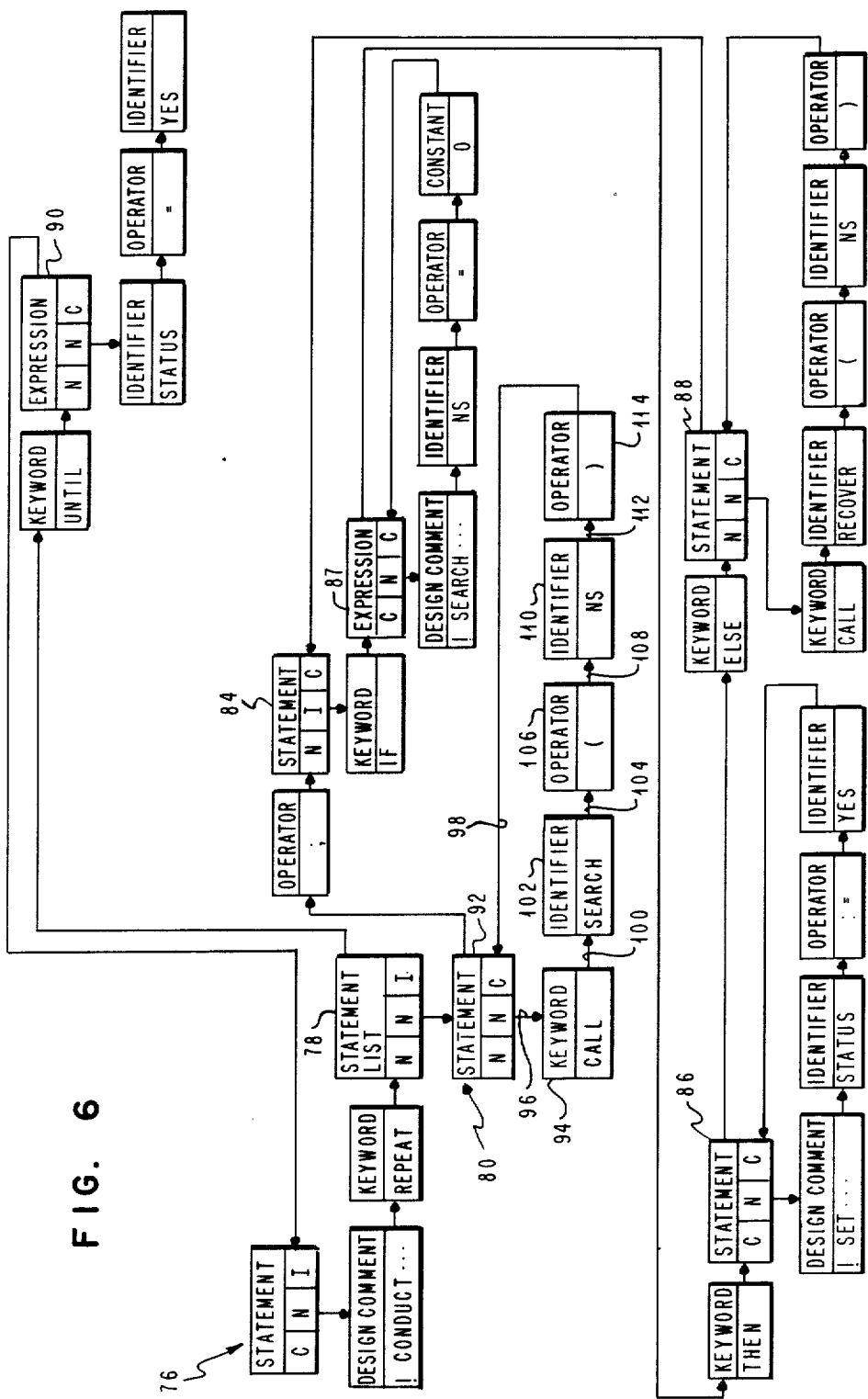
FIG. 6 is a schematic of the example Pascal code in FIG. 4.

The total syntax tree is illustrated in FIG. 6. The example listed in FIG. 4 is evaluated using the syntax tree schematic symbology as illustrated in FIG. 6. FIG. 6 illustrates the syntax tree 26 (FIG. 2) that results from the syntax analysis procedure 24 (FIG. 2). In FIG. 6, the design status fields in 92 will be explained. The self design status field is listed as N for none because no design statement is listed before the keyword call. Secondly, the top design field is listed as N because there is no design statement for the constituents in the call statement. The deep design status field is listed as C for consistent because there are no design constituents below the top level.

Figure 7A:
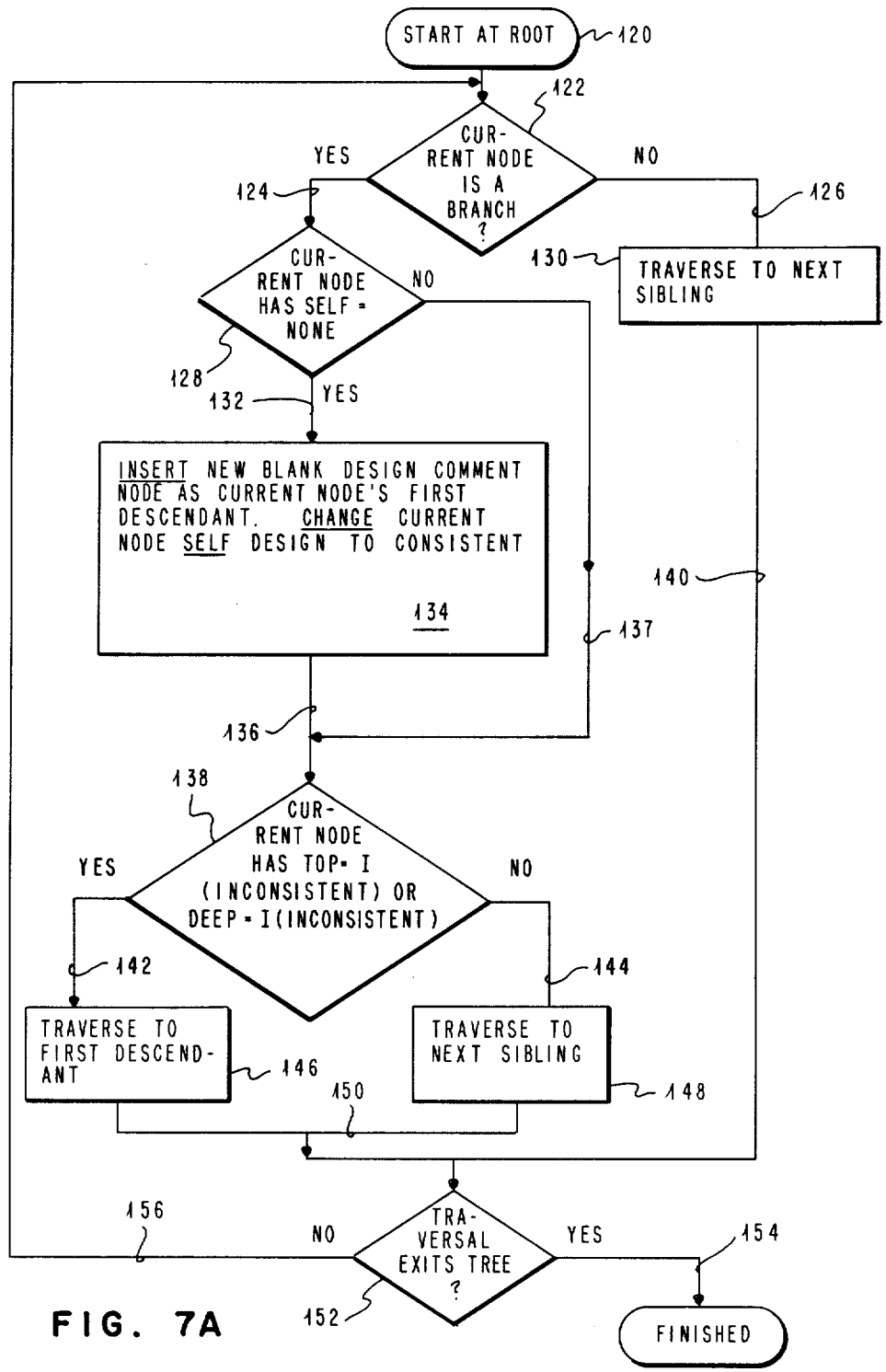
FIG. 7A is a flow chart illustrating the syntax analysis.

FIG. 7A illustrates the design analysis and design correction procedure 28 (FIG. 2) in flow chart form. Referring to FIG. 7A, the procedure starts at the root of the syntax tree, location 76 in FIG. 6, as illustrated by step 120. The next step is the decision 122 to determine whether the current node is a branch. If so, the procedure branches on line 124. If not, the procedure branches on line 126 to execute the step 130 which traverses to the next sibling and which is explained further in FIG. 7B. After traversing to the next sibling by step 130, the procedure progresses via line 140 to the next decision 152 to determine if the transversal procedure should exit the tree. Going back to step 122, if the current node is a branch, then step 128 is executed to determine if the current node has the self-design field equal none. If the current node does not have the self design field equal to "none", step 134 is not executed and the procedure progresses via line 137 to decision step 138. If the current node does have a self design field equal none, then the procedure progresses via line 132 to step 134 which inserts a new blank design comment as the current node's first descendant and the step changes the current node's self design field to a C or consistent. The procedure then progress via line 136 to decision step 138 which determines if the current node has a top status field equal to I or a deep status field equal to I. If so, the procedure progresses via line 142 to step 146 which traverses to the first descendant. If not, the procedure progresses via line 144 to execute the step 148 to traverse to the next sibling to be explained in more detail in FIG. 7B. After the execution of either steps 146 or 148, the program progresses via line 150 to the decision step 152. If the decision step 152 is a NO, the procedure progresses via line 156 back to decision step 122 as shown. If the procedure is to exit, the procedure progresses via line 154 and is completed.

Figure 7B:
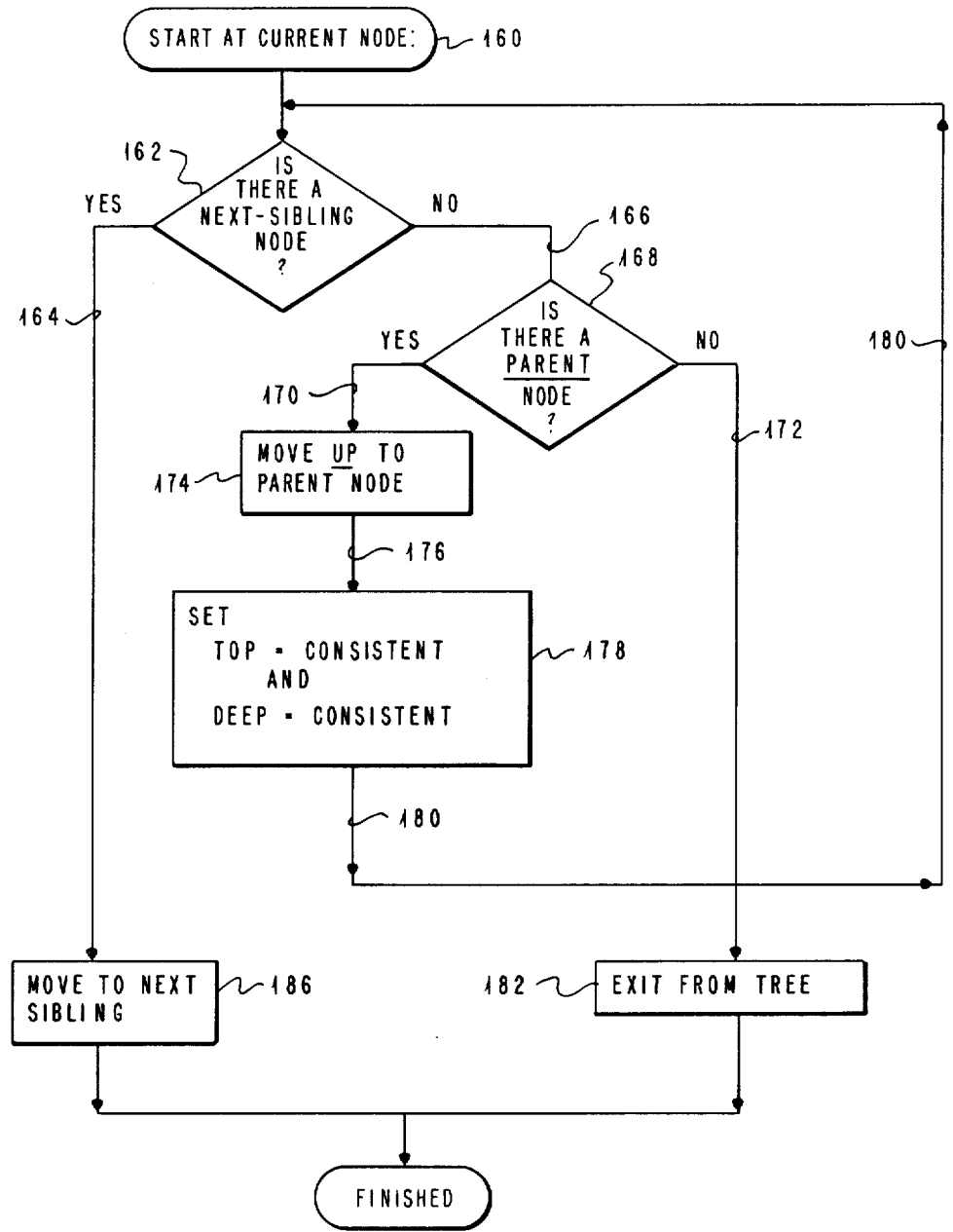
FIG. 7B is a flow chart illustrating the transverse to next sibling procedure of FIG. 7A.

FIG. 7B illustrates in flow chart form the steps traversed to the next sibling 130 and 148 of FIG. 7A. The steps start at the current node 160 and progress to the first decision 162 to determine if there is a next sibling node. If there is, the procedure continues via line 164 to step 186 which moves to that next sibling and this procedure step 130 is exited. If there is not a next sibling node, then the procedure progresses via line 166 to the decision step 168 to determine if there is a parent node. If there is no parent node, the procedure progresses via line 172 to exit from the tree, step 182 and via line 184 exiting from the procedural step. If there is a parent node, the procedure progresses via line 170 to step 174 which moves up to the parent node. Upon the completion of this step 174, the procedure progresses via line 176 to step 178 which sets the top design code status field to consistent or C and the deep design code status field to consistent or C. Upon exiting step 178, the procedure progresses via line 180 back to step 162.

Figure 8:
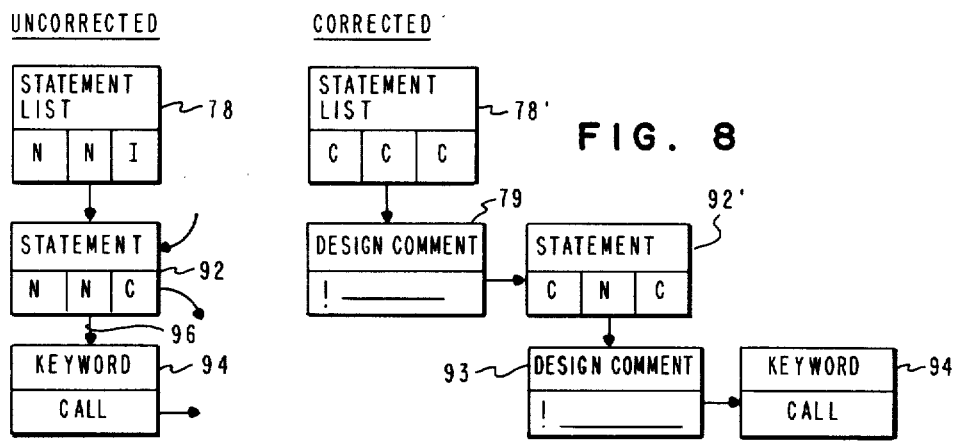
FIG. 8 illustrates schematically the correction of the omission in the design documentation code in the call statement of the example in FIG. 4.

FIG. 8 illustrates the correction of an example portion of the syntax tree in FIG. 6. Specifically, branch node 78 is defined as having a self design code status field of N, a top design code status field of N and a deep design code status field of I. Correspondingly, the branch node 92 includes the design code status fields of NNC. The corrected syntax includes the addition of the design code comments 79 and 93 as shown. These are added as design comment templates and illustrated as including the exclamation point designating the statement as a design code statement and including a blank line indicating that there has been an omission. The branch node 92 includes a changed self design code status field of C reflecting the addition of the design comment 93. Likewise, branch node 78' includes a self design code status field of C reflecting the addition of design comment 79. The top and deep design code status fields of branch node 78' are both listed as consistent as a result of the addition of the design comment 93.

Figure 9:
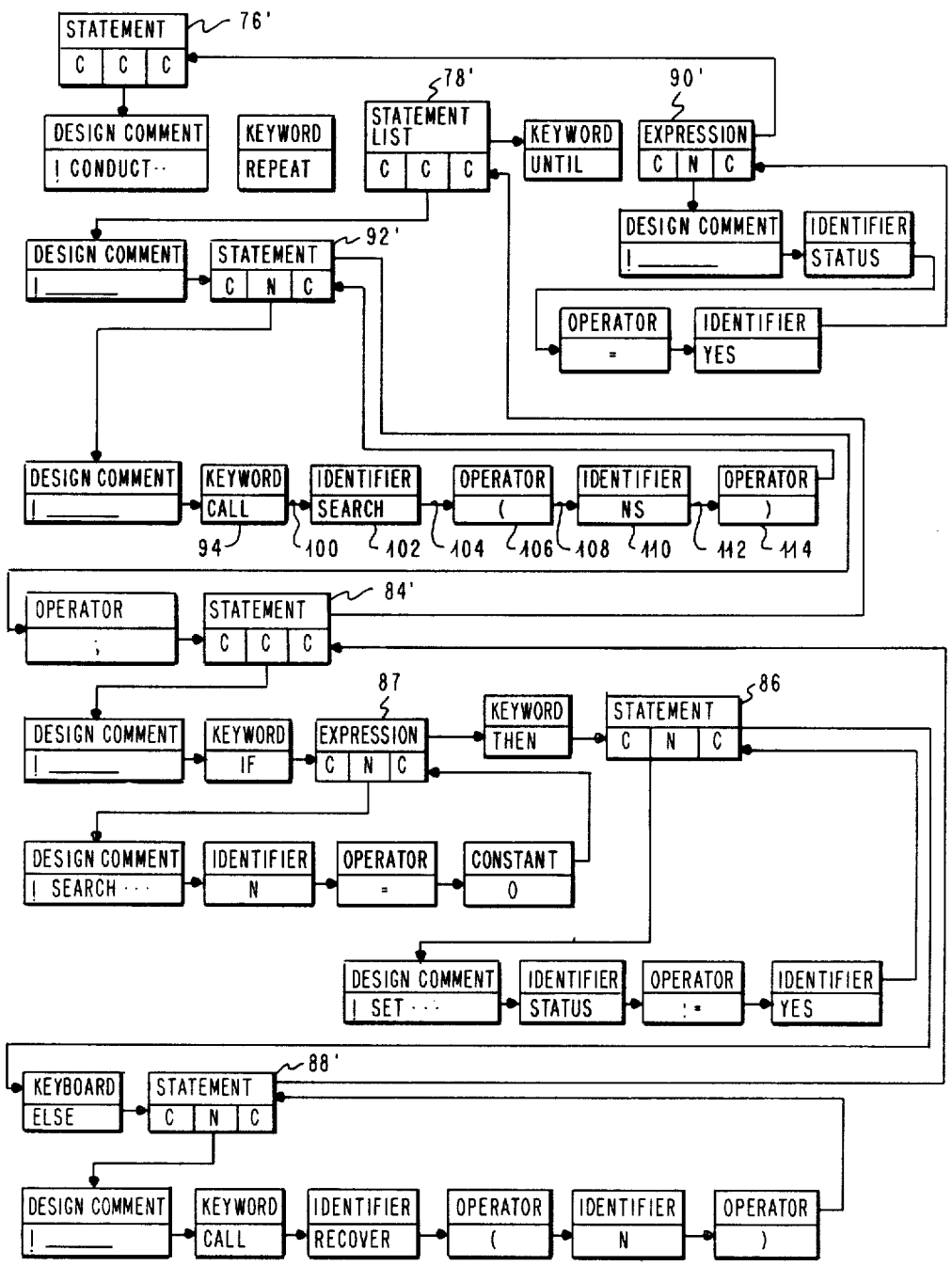
FIG. 9 is a complete schematic representation of the design corrected syntax tree for the example Pascal code in FIG. 4.

The syntax tree of FIG. 6 in corrected form after the execution of the algorithms in FIGS. 7A and 7B is illustrated in FIG. 9. As illustrated, several design comment templates have been inserted into the syntax tree and the appropriate design code fields of the branch nodes have been modified.

The resulting listing of the program source code of FIG. 4 is illustrated in FIG. 10. Note that the addition of the design code comment templates indicate to the programmer where additional design comments are required.

Figure 11A:
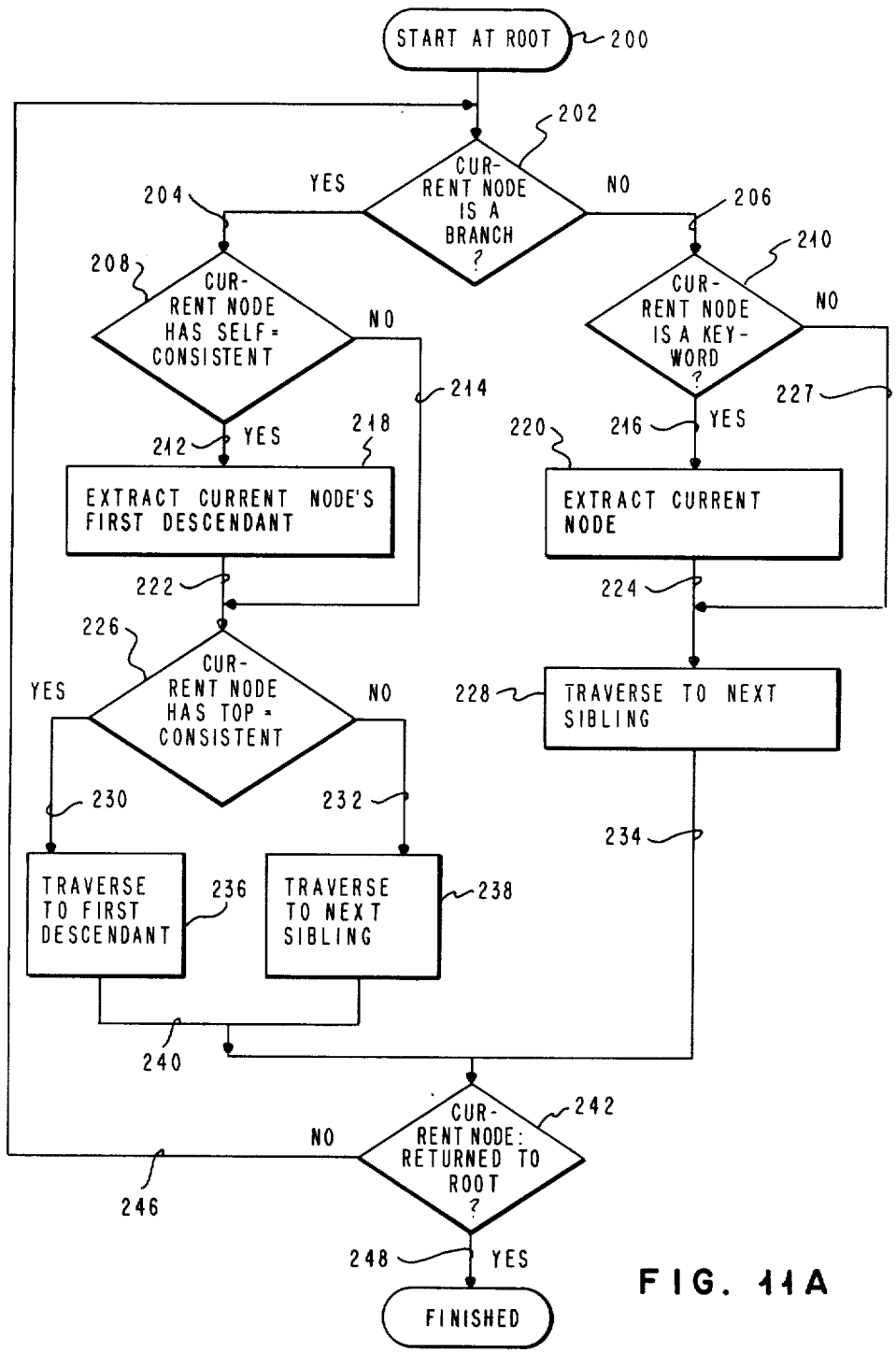
FIG. 11A is a flow chart illustrating the procedure to extract design documentation code from the design corrected syntax tree.

Returning to FIG. 2, the design extractor procedure 32 is performed on the design corrected syntax tree 30 (represented by the corrected design syntax tree in FIG. 9). FIG. 11A illustrates in flow chart form the design extractor procedure 32. The procedure starts at the root of the syntax tree illustrated by step 200 and proceeds to step 202 which is a decision step to determine if the current node being examined is a branch. If the node is a branch, the procedure progresses via line 204 to decision step 208 which determines if in that current node that the self design code field is consistent or C. If not, the procedure progresses via line 214 to step 206. If the current node self design code status field is consistent, C, then the procedure progresses via line 212 to step 218 which extracts the current node's first descendant and which will be discussed in more detail in FIG. 7C. After step 218 is completed, the program progresses via line 222 to the decision step 226. In decision step 226, the current node is examined as to the top design code field. If this field is consistent, C, then the procedure progresses via line 230 to step 236 wherein the procedure traverses to the first decedent. If the top design code field is not consistent, then the procedure progresses via line 232 to step 238 which causes the procedure to traverse to the next sibling. Upon exiting steps 236 or 238, the procedure proceeds via line 240 to the decision step 242. Returning to step 202, if the current node is not a branch, the procedure progresses via line 206 to decision step 210 to determine if the current node is a keyword. If the current node is not a keyword, it is not extracted and the procedure progresses via line 227 to step 228. If the current node is a keyword, then the procedure progresses via line 216 to step 220 which extracts the current node's first decedent. After completing step 220, the procedure progresses via line 224 to step 228 which causes the procedure to traverse to the next sibling. Upon completing step 228, the procedure progresses via line 234 to the decision node 242 which determines whether or not the current node has returned to the root. If not, the procedure progresses via line 246 to the beginning of the loop as shown. If the current node is returned to the root, the procedure progresses via line 248 to exit from this procedure.

Figure 11B:
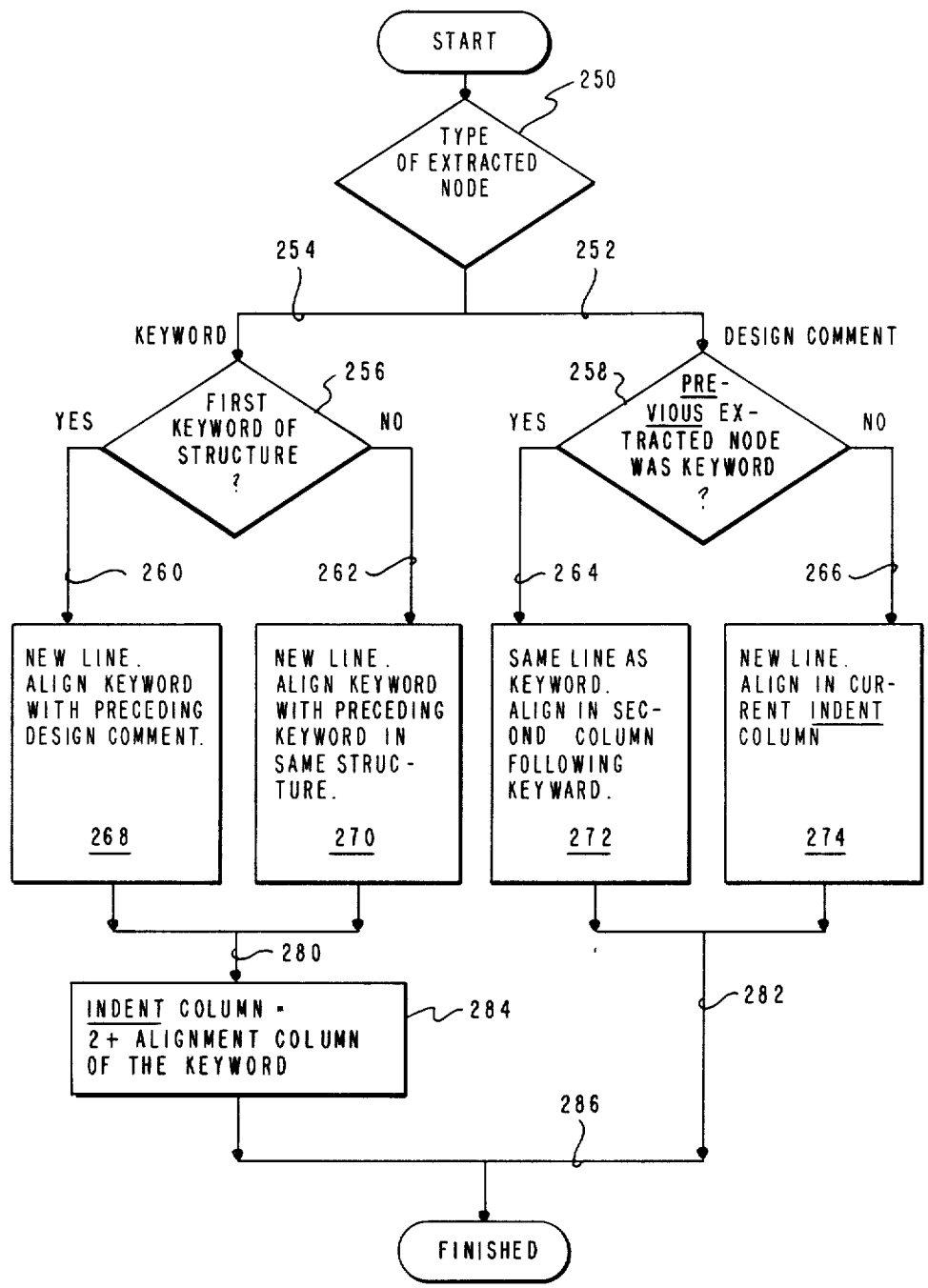
FIG. 11B is a flow chart illustrating the formatting procedures of FIG. 11A.

Steps 218 and 220 are illustrated in flow chart form in FIG. 11B. Upon entering these formatting steps, a decision is made based on the type of node that is extracted. If that node contains only a keyword, the procedure progresses via line 254 to the decision step 256 to determine if the keyword is the first keyword of a structure. If so, the procedure progresses via line 260 to step 268 which determines that the compiler is to go to the next new line and align the keyword with the proceeding design comment. If the keyword is not the first keyword of the structure, the procedure progresses via line 262 to step 270 which causes the compiler to go to a new line and align the keyword with the proceeding keyword in the same structure. Upon exiting either steps 268 or 270, the procedure progresses via line 280 to step 284 which indents the lines two columns past the keyword. After step 284, the procedure progresses via line 286 to exit. Returning to step 250, if the extracted node includes a design comment, then the procedure progresses via line 252 to the decision step 258 to determine if the previous extracted node word was the keyword. If so, the procedure progresses via line 264 to step 272 wherein the compiler stays on the same line as the keyword and aligns the design code statement in the second column following the keyword. If the extracted node word was not a keyword, the procedure progresses along line 266 to step 274 wherein a new line is formed which is aligned in the current indent column. Upon exiting either steps 272 or 274, the procedure progresses via line 282 to exit.

Figure 11C:
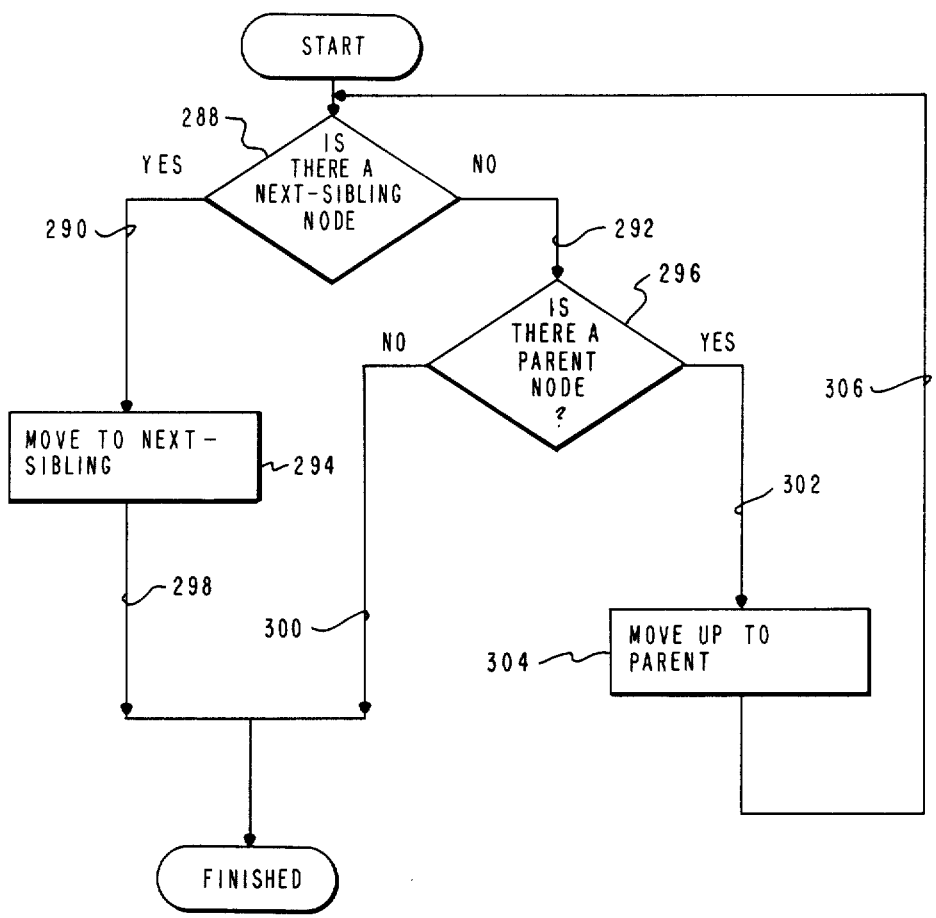
FIG. 11C is a flow chart illustrating the transverse to next sibling while extracting procedure of FIG. 11A.

FIG. 11C illustrates in flow chart form the steps 228 and 238 of traversing to the next sibling. The first step in this procedure is the decision step 288 which determines if there is a next sibling node. If so, the procedure progresses via line 290 to step 294 which moves the compiler to the next sibling and then via line 298 to exit. If there is not a next sibling, the procedure progresses via line 292 to decision step 296 to determine if there is a parent node. If not, the procedure exits via line 300. If there is a parent node, the procedure progresses via line 302 to step 304 which moves the compiler up to the parent node and loops back to decision step 288 via line 306.

The extracted design comments from the design extractor procedure 32 (FIG. 2) is illustrated in FIG. 12. After a programmer has completed the design comments, i.e., has filled in the blanks, the extracted design text will be a complete design documentation of the source code.

Although the invention has been described with reference to this specific embodiment, this description is not meant to be construed in a limiting sense. Various modifications of the disclosed embodiment, as well as other embodiments of this invention, will become apparent to those persons skilled in the art upon reference to the description of this invention. It is, therefore, contemplated that the appended claims will cover any such modifications or embodiments as fall within the true scope of this invention.

We claim:

1. An apparatus for producing machine-executable object code, a program listing, and corresponding design documentation from a source program having a plurality of statements of implementation code including keywords, and a plurality of statements of design documentation code corresponding to the keywords of the implementation code, said apparatus comprising:
    input means for reading said source program;
    compilation means for producing (a) the machine-executable object code from said implementation code, said machine-executable object code including executable commands derived from the implementation code keywords, and (b) the program listing as a listing of all the implementation code in the order of appearance in the source program; and extractor means for producing the design documentation by listing all the corresponding design documentation code with keywords in the order of appearance in the source program.

2. An apparatus according to claim 1 wherein said extractor means further includes means for producing a separate listing of the design documentation.

3. An apparatus for producing machine-executable object code, a program listing, and verified design documentation from a source program having a plurality of statements of implementation code including keywords, and corresponding design documentation code including keywords identical to the keywords of the corresponding implementation code, each of said design code statements further including a symbol designating the statement as design code, said apparatus comprising:

input means for reading said source program;

comparison means for verifying that the implementation code keywords include the corresponding design documentation code;

error indication means for signifying any locations in the source program where the implementation code does not include corresponding design documentation code;

compilation means for producing (a) the machine-executable object code from said implementation code, said machine-executable object code including executable commands derived from the implementation code keywords, and (b) the program listing as a listing of all the implementation code in the order of appearance in the source program; and extractor means for producing the design documentation by listing all the design documentation code statements in the order of appearance in the source program, said design documentation including any error indication from said error indication means.

4. An apparatus according to claim 3 wherein the error indication means signifies locations where keywords do not include corresponding design documentation code.

5. An apparatus according to claim 4 wherein said extraction means further includes means for detecting said design code statement symbols and separating said design code documentation from said implementation code.

6. An apparatus according to claim 5 wherein said error indication means includes means for producing design comment templates printed to signify omissions of design documentation code.

7. A method for producing machine-executable object code, a program listing, and design documentation from a source code having a plurality of statements of implementation code including keywords, and corresponding design documentation code including keywords identical to the keywords of the corresponding implementation code, said method comprising the steps of:

reading said source program;

verifying that the implementation code keywords include the corresponding design code documentation;

signifying any locations in the source code program where the implementation code does not include corresponding documentation code;

producing machine-executable object code from said implementation code, said machine-executable object code including executable commands derived from the implementation code; and producing the program listing as a listing of the source program; and producing the design documentation by listing all the design documentation codes statements in the order of appearance in the source program.

8. A method according to claim 7 wherein said design documentation producing step includes the step of signifying locations where the design documentation code does not include keywords corresponding to the keywords of the implementation code.

9. A method according to claim 8 wherein said design documentation producing step includes the step of detecting a design code statement symbol and, in response thereto, separating said design documentation code from said implementation code.

10. A method according to claim 9 wherein said design documentation producing step includes the step of producing design comment templates printed to signify omissions of design documentation code.

* * * * *